Jan. 12, 1960          G. E. HOWARD          2,920,710
VEHICLE HAVING A SOLAR STEAM GENERATOR
Filed Dec. 17, 1956
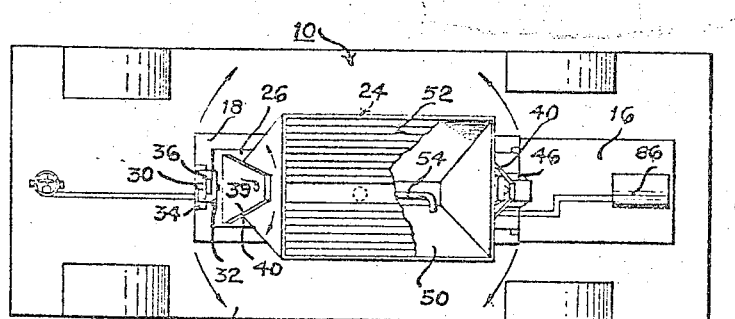
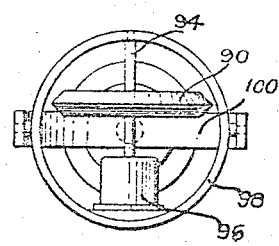
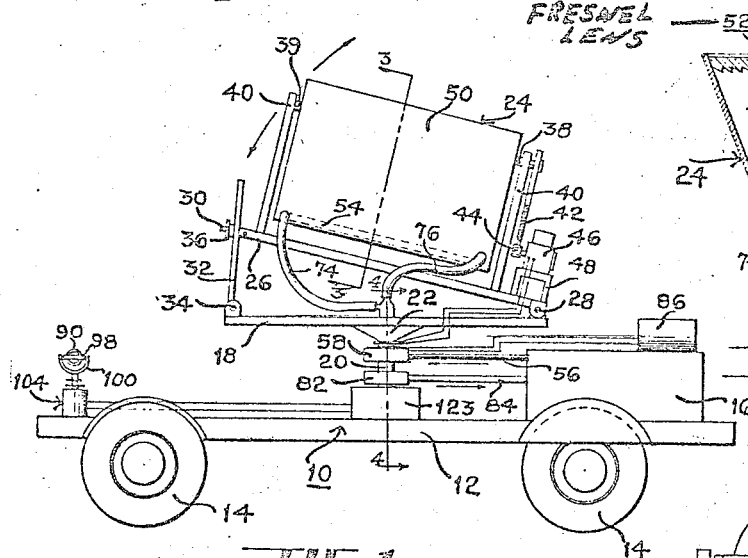
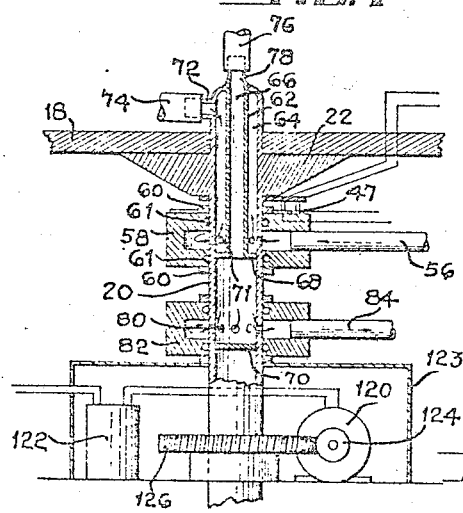
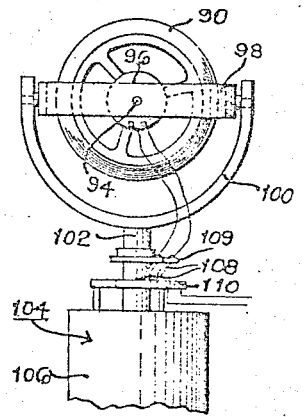
INVENTOR.
GEORGE E. HOWARD
BY
HIS ATTORNEYS

United States Patent Office 2,920,710
Patented Jan. 12, 1960

2,920,710
VEHICLE HAVING A SOLAR STEAM GENERATOR

George E. Howard, Dayton, Ohio

Application December 17, 1956, Serial No. 628,699

5 Claims. (Cl. 180—67)

This invention relates to a solar vehicle and more particularly to the combination with a mobile vehicle of a solar energy power supply adapted to propel the vehicle.

The present application is a continuation-in-part of my copending application Serial No. 525,186, filed July 29, 1955, and entitled Solar Energy Converter, which has since become abandoned.

An object of this invention is to provide a solar vehicle having solar energy collecting means mounted thereon and including means for orienting the collecting means upon the vehicle such that optimum collection of solar energy is possible regardless of the direction in which the vehicle is moving.

Another object of this invention is to provide an efficient solar energy collection and conversion apparatus adapted to be mounted upon a vehicle for the purpose of supplying power for the vehicle.

Other objects and advantages reside in the construction of parts, the combination thereof, the method of manufacture and the mode of operation, as will become more apparent from the following description.

In the drawings,

Figure 1 is a side elevational view of the solar vehicle of this invention.

Figure 2 is a top plan view of the vehicle of Figure 1.

Figure 3 is an enlarged sectional view taken substantially along the line 3—3 of Figure 1.

Figure 4 is an enlarged fragmentary elevational view, taken substantially along the line 4—4 of Figure 1, with parts shown in section, illustrating a mechanism for positioning the solar energy collection surface and also illustrating the construction of fluid conduits utilized in conveying power from the solar energy converter.

Figure 5 is an enlarged elevational view of a gyroscopic direction indicator employed in this invention.

Figure 6 is a top plan view of the gyroscopic direction indicator.

Referring to the drawing in detail, a steam propelled vehicle 10 is illustrated schematically in Figures 1 and 2. The vehicle 10 includes a chassis 12 mounted upon wheels 14, the chassis 12 supporting a closed cycle steam engine 16. The vehicle 10, may take any desired form, as for example, a steam operated automobile, a locomotive, or a boat, or the like.

In the present invention, solar energy is collected on the vehicle and utilized to generate steam for operating the steam engine. The solar energy collecting apparatus is illustrated in Figures 1, 2, 3, and 4. This apparatus is supported by a horizontal platform 18 which, in turn, is rotatably mounted upon a vertical axle 20 journalled in the chassis 12. The axle 20 is provided with a conical flange portion 22 serving as a seat for the platform 18. The platform is mounted so as to rotate independently of the axle 20, however, friction between the platform 18 and the conical flange portion 22 restrains such rotation.

The solar energy collector 24 is mounted upon a second platform 26, having one end thereof hingedly secured to the platform 18 at 28. The opposite end of the platform 26 has a threaded shaft 30 pivotally secured thereto. The shaft 30 projects through a vertical slot (not shown) in an arm 32 hingedly secured to the platform 18 at 34. The platform 26 is clamped to the arm 32 by a nut 36 threadedly engaging the shaft 30. This arrangement provides for inclination of the solar energy collector 24 thereby enabling compensation for the earth's orbital movement about the sun, as will be described subsequently.

The collector 24 is supported by axles 38 and 39 journalled in brackets 40, supporting the axles in spaced parallel relation to the platform 26. A sector gear 42 is secured to the axle 38. The sector gear 42 engages a pinion 44 driven by an electric motor 46, mounted upon a bracket 48 secured to the platform 26. This arrangement provides for rotation of the collector 24 about the axis defined by the axles 38 and 39, enabling compensation for the earth's rotation, as will be described subsequently.

As illustrated in Figure 3, the collector 24 comprises a fully enclosed substantially airtight box 50 having a trapezoidal cross-section, one side of which is a transparent Fresnel lens 52. The Fresnel lens, which may be glass, quartz, plastic, or the like comprises a plurality of parallel coplanar prismatic sections 53 which are designed, in accordance with well established optical principles, to focus normally incident plane parallel light of a predetermined wavelength upon an elongate rectangular surface within the box 50. Light of a greater of lesser wavelength will in general pass to one side or the other of this imaginary rectangle. A metallic conduit 54 is placed within the box 50 at substantially the focal plane of the lens 52. The conduit 54 has a blackened external surface for optimum light absorption. The arrangement is such that light of the predetermined focal wavelength as well as light of slightly greater or less wavelength will be focused upon the blackened conduit and absorbed thereby. The absorption of light by the conduit 54 produces thermal energy within the conduit, the conduit functioning as a boiler, converting solar energy into steam energy. By making the box 50 airtight, thermal convection currents tending to remove heat from the conduit 54 and dissipate that heat to the atmosphere are substantially eliminated.

The steam engine 16 operates on a closed cycle, such that the steam utilized in operating the engine is condensed to water, then recycled through the boiler, that is, the conduit 54. The condensing and recycling apparatus is well established in the art and therefore is not reproduced herein.

The condensed water, which is at a temperature near the boiling point, flows from the engine 16 through a conduit 56 to a coupler 58 mounted upon the vertical axle 20. The coupler 58 is rotatably mounted upon the axle 20 between spaced annular bearings 60 secured to the axle 20. Leakage around the coupler 58 is obstructed by suitable O-rings 61. The axle 20, which is hollow, as illustrated in Figure 4, is partitioned by an inner tubular sleeve 62 into two co-axial conduits 64 and 66. An apertured plate 68 at one end of the sleeve 62 terminates the outer conduit 64 and a plate 70 disposed in spaced relation to the plate 68 terminates the inner conduit 66. The coupler 58 communicates with the outer conduit 64 in the axle 20 through perforations 71 in the outer wall of the axle 20. This permits the water to flow upwardly in the axle 20 to an outlet 72 disposed above the platform 18. From the outlet 72, the water flows through a flexible hose 74 to one end of the conduit 54.

Within the conduit 54, steam is generated, the steam flowing through a flexible hose 76 to an inlet 78 communicating with the inner conduit 66 in the axle 20. From the inner conduit 66, the steam flows through perforations 80 in the outer wall of the axle 20 to a second rotary coupler 82 identical to the coupler 58. From the coupler 82, the steam flows through a conduit 84 to the engine 16. Although not illustrated, suitable insulation may be provided for the various steam and water conduits. It is to be noted that the outer conduit 64 in the axle 20 forms a warm water jacket for the inner conduit 66 through which the steam flows.

The apparatus thus far described, namely the combination of a solar energy collector, a solar energy converter, and a steam engine is recognized as old in the art, the combination being but one of the many systems available for the utilization of solar energy. If the axis defined by the axles 38 and 39 is oriented in a north-south direction and if the platform 26 is inclined such that the sun rays strike the surface of the lens 52 normally, the combination may be operated as a stationary steam engine. Of course, it is necessary to utilize a portion of the output of the steam engine to drive a generator 86 for energizing electrically the motor 46 to rotate the collector 24 in synchronism with the earth's rotation, thereby always maintaining the prismatic lens turned toward the sun.

In the present invention the solar collector 24 is mounted upon a vehicle. For successful operation of the moving solar collector 24, it is necessary that the solar collector be trained upon the sun regardless of the direction in which the vehicle moves. To accomplish this, the platform 18, upon which the solar energy collection mechanism is mounted, is rotated relative to the chassis 12 by a servo system which responds to a north-south indicating device.

The indicating device illustrated in detail in Figures 5 and 6 is mounted upon the chassis 12 at any convenient place. The indicating device comprises a flywheel 90 mounted upon the shaft 94 of an electric motor 96. The motor and shaft are mounted within a ring 98, in such a manner that the shaft 94 is free to rotate. The ring 98, in turn, is mounted within a gimbal 100 so as to rotate about an axis extending normal to and intersecting the axis of rotation of the shaft 94. The masses of the flywheel 90 and motor 96 are balanced about the axis of rotation of the ring 98.

The gimbal 100 is mounted upon the vertical shaft 102 of an indicating synchro motor 104. The housing 106 of the synchro motor 104 is fixedly secured to the chassis 12. The motor 96 is energized through contacts 108 supported by a bracket 109 carried by the shaft 102, the contacts engaging slip rings 110 secured to the motor housing 106.

The flywheel 90, when rotated at high speed by the motor 96, has the property of rotational inertia, in that it resists any force tending to change the direction of its axis of rotation in space. If the flywheel 90 is initially rotated in a vertical plane such that its axis of rotation is horizontal, the mounting is such that the axis of rotation of the flywheel 90 will remain horizontal regardless of the tilt of the chassis 12 away from the horizontal. Any tilt of the chassis 12 is resolved into two motions relative to the axis of rotation of the flywheel 90, one being rotational motion of the gimbal 100 relative to the ring 98, which remains horizontal, and the other being a pure translation of the rotational axis in space, without change in direction. If the vehicle is turned on a horizontal plane, the axis of rotation of the flywheel 90 will retain its fixed direction in space and the housing 106 of the indicating synchro motor 104 will turn relative to the shaft 102. In effect, then, the flywheel 90 is mounted like a gyroscope, in that the axis of rotation of the flywheel 90 may retain its fixed direction in space regardless of the movement of the vehicle 10.

The gyroscope described establishes an axis which is fixed in space. For the present purposes, however, it is necessary to have an axis which is fixed relative to that of the earth's rotation. Such an axis can be obtained with precision with the aforesaid gyroscope only if the gyroscopic axis is parallel to the earth's axis of rotation. If the gyroscopic axis is not parallel to the earth's axis, the gyroscope will appear to precess as the earth revolves. The apparent precession is more or less pronounced depending upon the starting position of the gyroscopic axis. Where the axis points north and south and is horizontal, the apparent precession is nill at the equator, where the gyroscopic axis would be substantially parallel to the earth's axis, and most pronounced at the poles, where the gyroscopic axis would be normal to the earth's axis. Since the solar vehicle operates only during daylight hours, the precision of positioning afforded by a mere horizontally disposed gyroscopic axis pointing substantially north and south is sufficient for most purposes in the temperature and tropical regions. The tedious task of starting the gyroscope on an axis parallel to the earth's axis may therefore be eliminated.

The indicating synchro motor 104 associated with the north indicating gyroscope is connected electrically to a power synchro motor 120 through a balancing unit 122 housed in a housing 123. The power synchro motor 120 controls the position of the axle 20 through a worm 124 engaging a gear 126 secured to the axle 20. The indicating and power synchro motors constitute a conventional position control servo system, wherein the position of the axle 20 relative to the chassis 12 is determined by the position of the shaft 102 in the indicating synchro motor 104 relative to the housing 106. Thus, the horizontal projection of the axis defined by the axles 38 and 39 in the collector apparatus may be maintained parallel to the horizontal projection of the gyroscopic axis, that is, in a general north-south direction. Minor adjustments in the alignment of these axles may be made by manually rotating the platform 18 relative to the axle 20.

Electrical power for operating the servo system, the gyroscope motor 96, and the motor 46 is derived from the generator 86 operated by the steam engine. Battery power may be employed for operating these motors at start-up times before steam power is available. Electric power is supplied to the motor 46 through slip ring contacts 47 mounted on the coupler 58.

In general, three conditions must be met before this invention will operate efficiently. First, the axis defined by the axles 38 and 39 must be positioned substantially normal to the plane defined by the earth's orbit about the sun; second the horiozntal projection of this axis must extend substantially north and south; and third, the platform 18 must be horizontal.

The vehicle may be employed effectively as a farm tractor where the land is substantially level. Non-uniformities in the contour of the land will merely produce an overall reduction in the operating efficiency of the collector 24 which can be compensated for by enlarging the collector lens 52.

The device is limited in that it can travel for only a short distance in any given direction. Obviously, should the vehicle travel in an east or west direction for any appreciable distance, the synchronism of the motor 46 with the rotation of the earth would be in material error. Similarly, an appreciable movement of the vehicle north or south would produce a material error in the inclination of the platform 26. For this reason, the vehicle is essentially a vehicle of restricted movement, wherein its usefulness is confined to a relatively small area such as a farm, a town, or a small lake. Any distance travel would necessarily require periodic adjustments of the collector mechanism.

It is to be understood that this invention, which relates to the useful combination of a solar energy power supply with a mobile vehicle is not limited in scope to the creation and utilization of steam power, but rather embraces any system by which motive power may be obtained from solar energy.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. In a self-propelled vehicle including, in combination, motive means for propelling the vehicle, solar energy collecting means, and power conversion means energized by the solar energy collected for supplying power to said motive means, said solar energy collecting means including a light collecting lens and means for supporting said lens on said vehicle substantially normal to the sun's rays, said last named means including axle means defining a rotational axis parallel to the plane of said lens, means for rotating said lens about said axis at a rate substantially equal to the rate of the earth's rotation, and means for inclining said axis to the horizontal whereby said axis when extending north and south may be oriented normal to the plane defined by the earth's orbit about the sun, the improvement including means providing a north-south axis on said vehicle, and means for maintaining the horizontal projection of said rotational axis parallel to said north-south axis.

2. In a self-propelled vehicle, the improvement according to claim 1 wherein the means providing a north-south axis on said vehicle includes a gyroscope.

3. In a self-propelled vehicle, the improvement according to claim 1 wherein the means providing a north-south axis on said vehicle includes a gyroscope, and wherein the means for maintaining the horizontal projection of said rotational axis parallel to said north-south axis comprises an indicating synchro motor responsive to said gyroscope and a power synchro motor coupled with said indicating synchro motor for positioning the rotational axis of said collecting means in predetermined relationship to the rotational axis of said gyroscope.

4. In a self-propelled vehicle including, in combination, motive means for propelling the vehicle, solar energy collecting means, and power conversion means energized by the solar energy collected for supplying power to said motive means, said solar energy collecting means including a generally planar light collecting element and means for supporting said element on said vehicle in a plane substantially normal to the sun's rays, said last named means including axle means defining a rotational axis parallel to the plane of said element, means for rotating said element about said axis at a rate substantially equal to the earth's rotation, and means for inclining said axis to the horizontal whereby said axis when extending north and south may be oriented normal to the plane defined by the earth's orbit about the sun, the improvement including means providing a north-south axis on said vehicle, and means for maintaining the horizontal projection of said rotational axis parallel to said north-south axis.

5. A device for collecting solar energy on a movable vehicle comprising, in combination, a generally planar light collecting element, and means supporting said element on said vehicle in a plane substantially normal to the sun's rays; said last named means including axle means defining a rotational axis parallel to the plane of said collecting element, means for rotating said collecting element about said axis at a rate substantially equal to the earth's rotation, means for inclining said axis to the horizontal whereby said axis when extending north and south may be oriented normal to the plane defined by the earth's orbit around the sun, means providing a north-south axis on said vehicle and means maintaining the horizontal projection of said rotational axis parallel to said north-south axis.

References Cited in the file of this patent

UNITED STATES PATENTS

| | | |
|---|---|---|
| 111,644 | Hermance | Feb. 7, 1871 |
| 698,232 | Straker | Apr. 22, 1902 |
| 726,967 | Mills et al. | May 5, 1903 |
| 937,013 | Severy | Oct. 12, 1909 |
| 2,249,642 | Turner | July 15, 1951 |